United States Patent Office 2,972,631
Patented Feb. 21, 1961

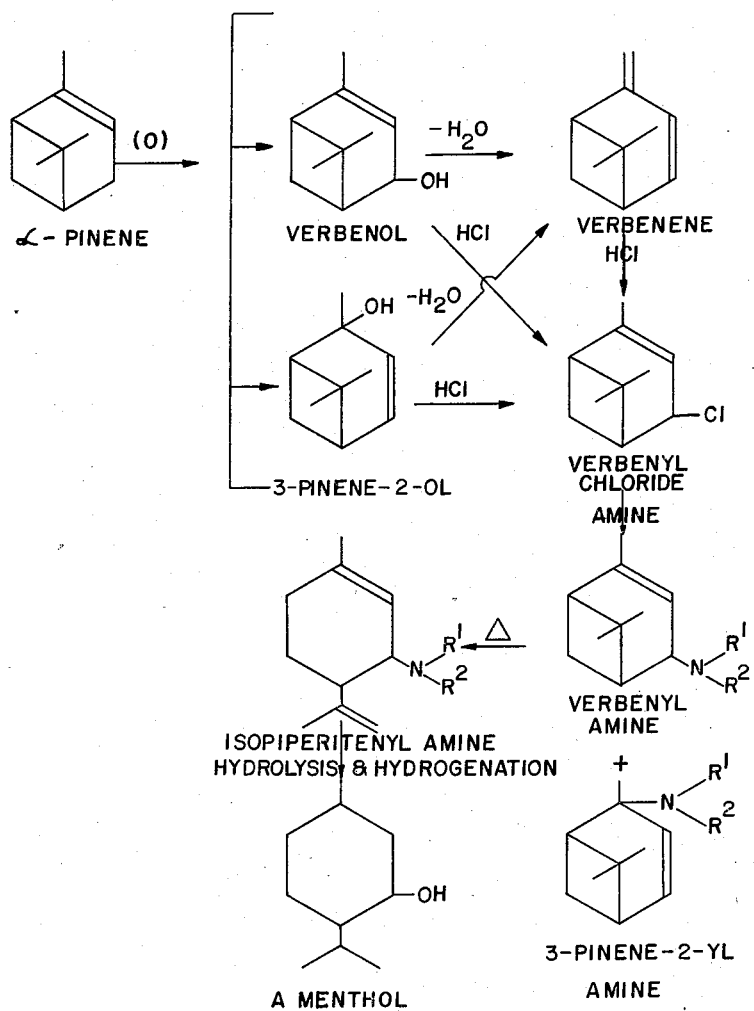

2,972,631

PREPARATION OF VERBENYL COMPOUNDS

Joseph P. Bain and Albert B. Booth, Jacksonville, Fla., assignors to The Glidden Company, Cleveland, Ohio, a corporation of Ohio Filed Sept. 14, 1953, Ser. No. 388,414

24 Claims. (Cl. 260—563)

The present invention relates to the preparation of verbenyl compounds and particularly relates to verbenyl chloride and compounds derivable therefrom.

As is well known, halides are among the most valuable members of any series of compounds for organic synthetic chemistry. From the halides can be derived the alcohol, ethers, amines, nitriles, esters, etc., all by well-known means, whereby the halogen is replaced by an analogous group of the desired compound. Moreover, the halide is usually the compound of choice for Grignard reactions, aceto-acetic ester and malonic ester syntheses, nuclear alkylations, Wurtz-Fittig reactions, etc.

Heretofore, 4-substituted derivatives of α-pinene verbenyl compounds, have been generally unknown, despite the fact that α-pinene is the principal constituent of turpentine. Exceptions are the alcohol, verbenol and the ketone verbenone.

As shown in the copending application of Bain et al., Serial No. 352,291, filed April 30, 1953, now Patent No. 2,911,442, verbenol and its allylomer, 3-pinene-2-ol, can be prepared in good yield from α-pinene. Since these compounds can be made to directly yield relatively few members of the verbenyl series, a more versatile intermediate, such as a halide, is highly desirable.

It is accordingly a principal object of the present invention to provide a verbenyl halide.

A more specific object is to prepare verbenyl chloride.

Another object is to provide a method for making verbenyl chloride from verbenol and/or its allylomer, 3-pinene-2-ol.

A further object of the invention is to provide valuable verbenyl compounds.

An additional object is to produce valuable monocyclic end products from verbenyl intermediates.

Other objects will be apparent to those skilled in the art from the following description.

The drawing is a flow sheet illustrating the reactions involved in the invention.

It is known that when α-pinene is treated with aqueous HCl that monocyclic hydrochloride addition products are formed and that when α-pinene is treated with dry HCl, bornyl chloride is produced. It was therefore not to be expected that when verbenol, which possesses the α-pinene structure, was treated with either aqueous or dry HCl, no isomerization occurred, but instead the hydroxy group was cleanly replaced by a chloride radical in practically quantitative yields. It has also been found that the allylomer of verbenol, 3-pinene-2-ol, also yields verbenyl chloride on treatment with HCl, and thus the two allylomers are equivalents for this purpose.

Verbenene is known to be produced by dehydration of verbenol. We have now found that treatment of verbenene with hydrogen chloride yields verbenyl chloride in excellent yield despite the fact that verbene contains two double bonds and that it might be expected that verbenyl chloride would itself add a molecule of hydrogen chloride to form a dihydrochloride of verbenene.

As a specific illustration of the usefulness of the invention, verbenyl chloride is a useful intermediate in the preparation of verbenyl amines, which in turn are readily convertible into menthol, thymol and related products. Thus, the verbenyl amines can be isomerized to the corresponding monocylic isopiperitenyl amines which can then be hydrogenated to the corresponding stereoisomeric menthylamines. The menthylamines can then be hydrolyzed by known methods, such as that of Bain and Pollard, J. Am. Chem. Soc. 61, 2704 (1939), to a menthol or can be treated with nitrous acid in the known manner, if the amine is primary, to yield menthols, etc. Alternatively, the isopiperitenyl amines can be treated with Raney nickel and water at reflux or at higher temperatures whereby the nitrogen-containing substituent attached to the 3-position of the p-menthane derivative is replaced by an oxygen-containing substituent and whereby compounds capable of hydrogenation to menthol are produced.

The 3-pinene-2-ol can be prepared by decomposing the air oxidation mixture of α-pinene with aqueous alkaline sodium sulfite solution and fractionally distilling the mixture to recover fractions rich in this substance, as is more fully described and claimed in the copending application of Bain et al., Serial No. 352,291, filed April 30, 1953, now Patent No. 2,911,442. Since verbenol is also recovered from the same reduced oxidation mixture in substantial yield, such mixtures provide a ready source of starting material for the practice of the present invention.

We have also found that in addition to the verbenyl amines, 3-pinene-2-yl amines are formed on reacting verbenyl chloride with ammonia or amines. Some 3-pinen-2-yl chloride may be present in our verbenyl chloride, but we believe that 3-pinene-2-yl amines are produced from the allylomeric form, verbenyl chloride, and that the chloride exists chiefly, if not exclusively, in this form. The 3-pinene-2-yl amines and their derivatives are novel products believed to possess pharmacological value as well as value for wetting compositions and the like.

The procedures referred to above are illustrated in the flow sheet.

The following examples are illustrative.

Example 1

137 grams (0.9 mol) of transverbenol, $[\alpha]_D$ —155°, was agitated for 5 minutes with 200 grams of 37% hydrochloric acid with tap water cooling. The oil layer was then separated and found to weigh 149 grams (theory=153.5 grams). On shaking the oil layer similarly with a fresh 200-gram portion of acid, its weight increased to 151 grams, which is 98.5% of the theoretical. Absence of hydroxyl absorptions in the infrared spectrogram showed that no alcohol remained. This crude verbenyl chloride showed a rotation $\alpha_D^{25}$ —165° (10 cm. tube).

135 grams of this verbenyl chloride was stirred at room temperature with 500 grams of water and 85 grams of $CaCO_3$ (precipitated chalk). Carbon dioxide was evolved at a good rate. When the evolution of $CO_2$ slowed, the mixture was heated slowly to 100° C. to assure completion of the reaction. The infrared absorption spectrogram of the product, when compared with an authentic spectrogram of verbenol, showed that the chloride hydrolyzed to verbenol in good yield, thus proving the retention of the pinene skeleton during formation and isolation of the chloride.

Verbenyl chloride distills at 77° C./10 mm., with some decomposition, and is therefore best used without distillation.

Example 2

152 grams (1.0 mol) of trans-verbenol, $[\alpha]_D$ —155°, was diluted with 152 grams pentane and HCl gas passed in through a fritted glass disperser until a 39 grams weight increase was obtained. The temperature was limited to 30° by cooling. The aqueous phase, which was separated amounted to 19 cc., close to the theoretical. The pentane was then evaporated from a portion of the product, by use of a vacuum pump at room temperature. The infrared spectrogram of this crude verbenyl chloride showed no alcohol remained and that the product was identical with that prepared in Example 1. The rotation was $\alpha_D^{25}$ —169° (10 cm. tube).

100 grams of the above solution of verbenyl chloride in pentane was stirred at room temperature for two hours with 200 grams of 28% aqueous ammonia. The pentane layer was then separated, washed with water, dried with anhydrous $Na_2CO_3$, and the pentane removed under vacuum. 40 grams of the resulting mixture was shaken with excess 10% acetic acid to extract the amine whereby 16 grams dissolved.

The aqueous extract was then shaken with hexane to remove any suspended alcohols, separated and then made strongly alkaline to set the amine free. The amine was extracted with hexane, and the hexane was then removed under vacuum. The infrared spectrogram showed the broad $NH_2$ absorptions characteristic of a primary amine in the 11–14$\mu$ range. The verbenyl amine was found to distill at 73° to 75° C./mm. and was separated from the fraction boiling at 68–73° C. at 10 mm., which was rich in 3-pinene-2-yl amine. A small amount of the verbenyl amine was stirred and refluxed with water containing Raney nickel for 20 hours. Ammonia was slowly evolved. The oil was then steam distilled and extracted with dilute acetic acid to remove any unchanged amine. The infrared spectrogram showed the product, $\alpha_{10\ cm.}^{25}$ —138°, to be a mixture of verbenone and verbanone by comparison with spectrograms of authentic verbenone and verbanone.

Verbenyl amine was pyrolyzed in a sealed tube at 250° C. for one hour. The product consisted of a crude isopiperitenyl amine as shown by the absorptions in the infrared region of the spectrum, particularly those associated with the $CH_2=C<$ grouping.

The non-amine portion from the treatment of verbenyl chloride with the aqueous ammonia was shown by its infrared absorption spectrogram to consist chiefly of a mixture of verbenol and 3-pinene-2-ol, by comparison with the spectrograms of authentic verbenol and 3-pinene-2-ol samples.

*Example 3*

500 grams of crude d-3-pinene-2-ol, $\alpha_{10\ cm.}^{25}$ +75.4°, M.P. 31°, was diluted with an equal amount of hexane and 121 grams dry HCl gas added, maintaining the temperature between 10° and 20° C. The separated water amounted to 58 cc. The product was shown by its infrared spectrogram to be verbenyl chloride identical with that produced from verbenol.

*Example 4*

50 grams of crude d-3-pinene-2-ol, $\alpha_{10\ cm.}^{25}$ +75.4°, M.P. 31°, was agitated with 100 grams of 37% hydrochloric acid for about 5 minutes. The separated oil layer weighed 54 grams (theory=56 grams). The infrared spectrogram of this product showed it to be verbenyl chloride identical with that obtained from verbenol. Due to the relatively low purity of the starting 3-pinene-2-ol, the resulting verbenyl chloride showed a rotation of only $\alpha_{10\ cm.}^{25}$ —130°.

*Example 5*

150 grams of verbenyl chloride freshly prepared from verbenol and aqueous concentrated hydrochloric acid and employing cooling was added in portions to a solution of 98 grams $NH_3$ gas dissolved in 500 grams methanol. The initial reaction was quite vigorous causing a small loss of product and was thereafter cooled with an ice bath. About halfway through the addition of the verbenyl chloride a solid began to separate. When the addition of the verbenyl chloride was complete, there was no further tendency toward temperature rise and the mixture was stirred for ½ hour more at room temperature. The solid was filtered off and amounted to 20 grams. It was water soluble and did not yield any oil when its water solution was made alkaline, thereby indicating that it was merely ammonium chloride. The filtrate was diluted with 2 parts of water and 120 grams of oil separated. Five cc. of the oil shaken with 100 cc. of 10% acetic acid in a cassia flask left 4 cc. undissolved, indicating that the oil contained about 20% of amines.

Pyrolysis of the verbenyl amine, as in Example 6, yields isopiperitenyl amine, which upon hydrolysis and hydrogenation gives menthol.

The infrared absorption spectrogram of the non-amine portion showed it to be a mixture of ethers. Verbenyl methyl ether was readily identified in the mixture by comparison with an authentic spectrogram of this product. The other ether had the double absorption between 13 and 14$\mu$ characteristic of 3-pinene-2-ol, though shifted slightly, and is therefore the methyl ether of 3-pinene-2-ol.

*Example 6*

Verbenyl chloride was prepared by passing dry HCl into 190 grams verbenol, $[\alpha]_D$ —155°, diluted with 190 grams hexane. After separation of the aqueous phase, the oil was cooled to —20° C. and mixed with 185 grams of dimethyl amine at that temperature. As only slow or negligible reaction appeared to occur at low temperatures, the mixture was finally transferred to a suitable pressure bottle and brought to room temperature. On standing for three days, some crystals were deposited. To hasten the reaction, the bottle was heated in a water bath at 50° for 11 hours. After cooling to room temperature, the excess dimethyl amines were vented, the product was washed with water, and the amine extracted with 10% acetic acid. The amine was then recovered from its acetate solution by making it alkaline.

The mixed amines distilled at 84–88° C. at 10 mm. and showed $\alpha_D^{25}$ —17.7° (10 cm. tube), thus indicating a mixture of the dextrorotatory 3-pinene-2-yl dimethyl amine and the levorotatory verbenyl dimethyl amine. Careful fractionation confirmed this and the verbenyl dimethylamine was recovered in fair purity from the mixture and showed $\alpha_D^{25}$ —69°. Its infrared absorption spectrogram showed absorptions corresponding to a tertiary amine. Its infrared spectrogram resembled that of verbenol and verbenyl methyl ether, and it had the absorption at 6.02$\mu$ which characterizes all verbenyl derivatives so far encountered by us.

Verbenyl dimethyl amine was heated in a sealed tube at about 250° C. for 2 hours. The infrared spectrogram of the pyrolysis product showed it to be crude isopiperitenyl dimethyl amine. This, upon hydrolysis, according to the method of Bain and Pollard, 61, J.A.C.S., 2704 (1934), followed by hydrogenation, leads to a mixture of menthols. Alternatively, the isopiperitenyl amine can first be hydrogenated and then hydrolyzed or the hydrolysis can be effected under reducing conditions.

*Example 7*

Treatment of verbenyl chloride with methyl amine in a manner similar to that of Example 6 yields a mixture of amines rich in 3-pinene-2-yl methyl amine and methyl verbenyl amine.

*Example 8*

Verbenene in an equal volume of pentane was saturated with hydrogen chloride while keeping the temperature below 10° C. When hydrogen chloride was no longer absorbed rapidly the product was allowed to stand for a few hours and then the solvent was removed in vacuo at about room temperature, leaving verbenyl chloride as a residue and in high purity as determined by infrared analysis. The yield was practically quantitative.

*Example 9*

Verbenyl chloride, produced from verbenol, $\alpha_D^{25}$ +39° (10 cm. tube), was treated with excess ammonia gas in a stainless steel autoclave at 25–40° C. for 24 hours, then at 75° C. for 4 hours. The autoclave was cooled and opened and excess 10% caustic soda solution was added. The mixture was agitated, allowed to settle and the oil layer was separated. The oil was washed once with water and then fractionated.

The amine product was fractionated at 10 mm. pressure to obtain two amines, one boiling at 70° C. $a_D^{25}$ −19.7° (10 cm. tube), the other boiling at 75° C., $a_D^{25}$ +20.8°. The amines were produced in about equal quantities and the total yield of amines was almost quantitative.

The lower boiling amine, which is of optical sign opposite to that of the verbenol from which it is prepared, showed on infrared examination a symmetrically disubstituted ethylene linkage and on hydrogenation with platinum oxide catalyst at 40 to 60 lbs. per square inch pressure absorbed one mole of hydrogen showing the presence of a single double bond. When the unsaturated amine was treated with twice its volume of water and about twice its weight of Raney nickel catalyst and the mixture refluxed for twenty hours, no hydrolysis of the amine took place, but it was found that the recovered amine was no longer unsaturated but was 2-amino-pinane identical with the product obtained by hydrogenation in the presence of platinum oxide. The reduction was evidently due to the hydrogen present in the Raney nickel.

It has been found in this laboratory that pinan-2-ol, the hydrogenation product of 3-pinene-2-ol, can be treated with boiling distilled water for two hours to yield α-terpineol. The 2-amino-pinane produced by hydrogenation of the 3-pinene-2-yl amine was treated with sufficient half-normal hydrochloric acid to make the solution slightly acidic, then with a slight excess of sodium nitrite solution. On warming, an oil separated and this was separated from the reaction mixture by cohobation. Analysis by infrared methods showed it to be practically pure α-terpineol, thus further proving the position of the amino group.

The higher boiling amine was proved to be verbenyl amine. On treatment of a sample thereof with an equal amount of water and an equal amount of Raney nickel at the boiling point of the mixture for 20 hours, practically pure verbanone was formed and identified by comparison of its spectrum with that of a known sample.

Verbenyl amine was hydrogenated with platinum oxide catalyst at 40–60 pounds per square inch pressure and at room temperature. It accepted one molar equivalent of hydrogen to form verbanyl amine. The verbanyl amine on boiling with an equal weight of water and Raney nickel for twenty hours yielded practically pure verbanone.

*Example 10*

Verbenyl chloride is treated with four molar equivalents of dimethyl amine in an autoclave and the mixture allowed to stand for several days during which some reaction takes place, but in order to complete the reaction, the mixture is heated for twenty-four hours at about 90 to 110° C. The autoclave is then vented to allow the excess dimethyl amine to escape. To the residue in the autoclave there is added excess caustic soda, and the oil layer which separates upon standing is separated and distilled to collect a fraction boiling at 80–90° C. at 10 mm., and which contains mainly verbenyl dimethyl amine but some 3-pinene-2-yl dimethyl amine. The crude mixture is pyrolyzed in the vapor phase by passing its vapors through a pyrolysis tube heated to 450° C. Rate of feed to the tube, which is 4 feet long, ¼ inch diameter, is about 10 grams per minute. The pyrolysate is split into two portions.

A. The first portion is treated with an equal weight of water and an equal weight of Raney nickel at the boiling point of the mixture for fifteen hours. The crude oily hydrolysis product is then distilled with steam and then hydrogenated at 145° C. with Raney nickel catalyst at about 1000 to 1500 pounds per square inch pressure for about 2 hours. The hydrogenation product is fractionated at 10 mm. pressure to separate material boiling below 75° C. at 10 mm. and which contains some amines. The fraction boiling at 75 to 100° C. at 10 mm. has an odor of menthol. The fraction boiling at 100 to 125° is largely acyclics. The crude fraction of menthols boiling at 75 to 100° C. at 10 mm. is oxidized by sodium dichromate and sulfuric acid in the usual manner for converting menthol to menthone. The oily product from the oxidation smells strongly of menthone and on fractionation yields a mixture of menthone and isomenthone, B.P. 78–84° at 10 mm.

B. The second portion is hydrogenated with Raney nickel at 1000 pounds per square inch pressure and at 150° C. until no further hydrogen absorption takes place. The hydrogenation product boils over the range 60 to 140° C. at 10 mm., but the desired menthyl dimethyl amines boil at 85 to 95° C. and are collected as a fraction boiling in this range. The menthyl dimethyl amines are hydrolyzed by heating them with equal weights of Raney nickel catalyst and water at 150° C. in a rocking autoclave for ten hours. The autoclave is cooled, opened and the products filtered from the catalyst. The catalyst is washed with benzene and the benzene washings added to the crude hydrolysis product. The hydrolysis product-benzene mixture is extracted with excess 10% hydrochloric acid to remove unreacted or partly reacted amines and the oil layer is then washed with sodium carbonate and fractionated. The fraction boiling at 75 to 95° C. at 10 mm. consists largely of menthone and menthols. Oxidation of this fraction with sodium dichromate-sulfuric acid mixture converts the menthols to a mixture of menthone-isomenthone which is then fractionated to a product of boiling point 80–85° C. at 10 mm. and consisting of about 65% menthone, 35% isomenthone.

*Example 11*

Verbenyl chloride was reacted with triethylene tetramine, ethanol amine, diethanol amine, cyclohexylamine, piperazine, phenethylamine and aniline. In each experiment, 10 parts of the amine by weight was dissolved in 30 parts of dioxane, and 5 parts by weight verbenyl chloride was added. The mixture was then heated slowly to the boiling point and allowed to reflux for two hours, then it was poured into 100 parts water containing 5 parts sodium hydroxide. Good yields of amines were obtained except in the case of the amino alcohols whose reaction products tended toward greater water solubility and yielded emulsions.

These were extracted, however, with ether and the amino alcohol derivatives were isolated by evaporation of the ether. Each of the isolated amine products was treated with an equivalent weight of oleic acid and the salts so formed were found to possess emulsifying power when tested by dissolving one gram of the salt in 10 grams pine oil and shaking this mixture with 10 cc. of water.

It will be understood that the foregoing examples are merely illustrative and that numerous variations therein are possible without departing from the invention. Thus, other amines than dimethyl amine can be employed for the formation of the verbenyl amine, such as methyl amine, ethyl amine, methyl ethyl amine, and, in general, any lower alkyl primary or secondary amine can be used.

Also other verbenyl compounds than the amines can be prepared as previously indicated.

The particular temperature employed during the formation of the chloride is not critical, but is preferably at or below the ambient temperature in order to avoid decomposition of the chloride and thermal isomerization of the verbenol.

In addition to their utility for the formation of menthols, either of the two types of amines described above can be converted to quaternary salts useful as antimicrobial agents.

Verbenol exists in both cis- and trans-forms, as does its allylomer, 3-pinene-2-ol, and any of these in either d, l or racemic forms can be used as starting materials. Verbenene also exists in optically active forms and either form or mixtures of these are suitable for conversion to verbenyl chloride and its derivatives.

The present invention is a continuation-in-part of the copending application of Bain, Gary and Booth, Serial No. 368,208, filed July 15, 1953, now Patent No. 2,834,814, wherein the verbenyl ether herein disclosed, and its preparation, is described and claimed.

In the specification and claims, the term "isopiperitenyl" is used to designate the limonene-3-yl radical by analogy to isopiperitenone.

Since hydrolysis of the isopiperitenyl amines may produce isopiperitenol, reference is made to the copending application of Bain et al., Serial No. 348,825, filed April 14, 1953, wherein isopiperitenol, its preparation by another method, and its hydrogenation are described and claimed.

Having described the invention, what is claimed is:

1. The process which comprises treating a terpenic compound selected from the class consisting of verbenol, its allylomer, 3-pinene-2-ol, and its dehydration product, verbenene, with HCl to form verbenyl chloride.
2. The process of claim 1 in which the terpenic material is verbenol.
3. The process of claim 1 in which the terpenic material is 3-pinene-2-ol.
4. The process of claim 1 in which the terpenic material is verbenene.
5. The process which comprises treating a terpenic material selected from the class consisting of verbenol, its allylomer, 3-pinene-2-ol, and its dehydration product, verbenene, with HCl to form verbenyl chloride, and then reacting the verbenyl chloride with an amino compound selected from the class consisting of $NH_3$, lower alkyl primary amines and lower alkyl secondary amines to form verbenyl amines.
6. The process which comprises treating a terpenic material selected from the class consisting of verbenol, its allylomer, 3-pinene-2-ol, and its dehydration product, verbenene, with HCl to form verbenyl chloride, reacting the verbenyl chloride with an amino compound selected from the class consisting of $NH_3$, lower alkyl primary amines and lower alkyl secondary amines to form a verbenyl amine, and heating the verbenyl amine to effect thermal isomerization thereof to an isopiperitenyl amine.
7. The process which comprises treating a terpenic material selected from the class consisting of verbenol, its allylomer, 3-pinene-2-ol, and its dehydration product, verbenene, with HCl to form verbenyl chloride, reacting the verbenyl chloride with an amino compound selected from the class consisting of $NH_3$, lower alkyl primary amines and lower alkyl secondary amines to form a verbenyl amine, heating the verbenyl amine to effect thermal isomerization thereof to an isopiperitenyl amine, and subsequently hydrolyzing the amino group and reducing the double bonds of the isopiperitenyl amine to form a menthol.
8. The process which comprises reacting verbenyl chloride with an amino compound selected from the class consisting of $NH_3$, lower alkyl primary amines and lower alkyl secondary amines.
9. The process of claim 8 in which the amino compound is $NH_3$.
10. The process of claim 8 in which the amino compound is an alkyl amine.
11. The process of claim 8 in which the amino compound is dimethyl amine.
12. The process which comprises heating a verbenyl amine selected from the class consisting of verbenyl amine and verbenyl lower alkyl amines to a temperature of the order of 250° C. to form the corresponding isomeric isopiperitenyl amine.
13. The process of claim 12 in which the amine is verbenyl amine.
14. The process of claim 12 in which the amine is lower alkyl amine.
15. The process of claim 12 in which the amine is a dimethyl amine.
16. Amines selected from the class consisting of verbenyl amine, verbenyl lower alkyl amines and their allylomeric 3-pinene-2-yl amines.
17. Verbenyl amine.
18. Verbenyl lower alkyl amines.
19. 3-pinene-2-yl amine.
20. Verbenyl dimethyl amine.
21. Isopiperitenyl amines selected from the class consisting of isopiperitenyl amine and isopiperitenyl lower alkyl amines.
22. Isopiperitenyl amine.
23. Isopiperitenyl lower alkyl amines.
24. Isopiperitenyl dimethyl amine.

References Cited in the file of this patent

Elsevier's Encyclopedia, vol. 12, page 497.
Beilstein: Vol. XII (main vol.), page 40 (2nd supp.), page 38.
Roberts et al.: JACS 71, pages 1630–32 (1949).
Ritter et al.: JACS 72, pages 2381–84 (1950).